(12) United States Patent  
Vicente

(10) Patent No.: US 9,196,146 B1  
(45) Date of Patent: Nov. 24, 2015

(54) VEHICULAR CARBON MONOXIDE DETECTOR

(71) Applicant: Sergio M. Vicente, Framingham, MA (US)

(72) Inventor: Sergio M. Vicente, Framingham, MA (US)

( * ) Notice: Subject to any disclaimer, the term of this patent is extended or adjusted under 35 U.S.C. 154(b) by 53 days.

(21) Appl. No.: 14/177,338

(22) Filed: Feb. 11, 2014

(51) Int. Cl.
*B60Q 1/00* (2006.01)
*G08B 21/14* (2006.01)

(52) U.S. Cl.
CPC ..................... *G08B 21/14* (2013.01)

(58) Field of Classification Search
CPC ....... G08G 1/144; G08G 1/147; G08G 1/146; G08G 1/0112; G08G 1/143; G08G 1/0129; G08G 1/0141; G08G 1/04; G08G 1/14; G08G 1/148; G08G 1/207; G08G 1/141; G08G 1/005; G08G 1/0116; G08G 1/0133
USPC ........... 340/425.5, 632, 438, 539, 407.1, 575, 340/576, 937, 439, 693, 691, 628
See application file for complete search history.

(56) References Cited

U.S. PATENT DOCUMENTS

| | | | |
|---|---|---|---|
| 4,530,817 A * | 7/1985 | Holter et al. | 422/122 |
| D350,300 S | 9/1994 | Browning et al. | |
| 5,739,756 A * | 4/1998 | Margulies | 340/632 |
| 6,057,755 A | 5/2000 | Phillips | |
| 6,072,398 A * | 6/2000 | Hayes et al. | 340/632 |
| 6,208,256 B1 * | 3/2001 | Fleming et al. | 340/632 |
| 6,672,954 B2 | 1/2004 | Shtanko | |
| 2002/0121967 A1* | 9/2002 | Bowen et al. | 340/425.5 |
| 2012/0310547 A1 | 12/2012 | Cristoforo | |
| 2014/0343788 A1* | 11/2014 | Hosey et al. | 701/36 |

* cited by examiner

*Primary Examiner* — Daniel Previl
(74) *Attorney, Agent, or Firm* — Kyle A. Fletcher, Esq.

(57) ABSTRACT

The vehicular carbon monoxide detector is a system that is specially configured for use with a vehicle in order to detect unsafe levels of carbon monoxide in and around said vehicle thereby issuing an alarm to alert persons in around or remote of said vehicle as to the elevated level of carbon monoxide associated with said vehicle. The vehicular carbon monoxide detector system includes an internal carbon monoxide sensor and an external carbon monoxide sensor that are both in wired communication with a vehicle computer. The vehicle computer may be integrated into a pre-existing vehicle or an add-on. The vehicle computer being wired to the vehicle battery derives the electricity required to operate all aspects of the carbon monoxide detector, and which includes a cellular transceiver for communication with a cellular telephone or operation of a vehicle horn/headlights/windows.

10 Claims, 4 Drawing Sheets

VEHICULAR CARBON MONOXIDE DETECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of carbon monoxide detectors, more specifically, a carbon monoxide detector that is specially adapted for use within a vehicle.

SUMMARY OF THE INVENTION

An embodiment of the disclosure meets the needs presented above by generally comprising a carbon monoxide detector system that is specially configured for use with a vehicle in order to detect unsafe levels of carbon monoxide in and around said vehicle thereby issuing an alarm to alert persons in around or remote of said vehicle as to the elevated level of carbon monoxide associated with said vehicle. The vehicular carbon monoxide detector system includes an internal carbon monoxide sensor and an external carbon monoxide sensor that are both in wired communication with a vehicle computer. The vehicle add-on. The vehicle computer being wired to the vehicle battery derives the electricity required to operate all aspects of the carbon monoxide detector, and which includes a cellular transceiver for communication with a cellular telephone or operation of a vehicle horn/headlights/windows. The vehicle computer monitors carbon monoxide levels inside of as well as outside of the vehicle, and also whether the engine of the vehicle is operating.

An object of the invention is to provide a vehicular carbon monoxide detector that senses carbon monoxide inside of or outside of the cabin of the vehicle, and which is able to emit an alarm when unsafe levels of carbon monoxide is detected.

Another object of the invention is for the carbon monoxide detector system to utilize the vehicle's horn, headlights and/or to roll down windows of said vehicle in order to enable fresh air to enter inside of the cabin of the vehicle in the event of an unsafe level of carbon monoxide.

Another object of the invention is for the carbon monoxide detector system to include a cellular transceiver that is configured to communicate with a cellular telephone as an alarm in the event of detection of an unsafe level of carbon monoxide.

These together with additional objects, features and advantages of the vehicular carbon monoxide detector will be readily apparent to those of ordinary skill in the art upon reading the following detailed description of presently preferred, but nonetheless illustrative, embodiments of the vehicular carbon monoxide detector when taken in conjunction with the accompanying drawings.

In this respect, before explaining the current embodiments of the vehicular carbon monoxide detector in detail, it is to be understood that the vehicular carbon monoxide detector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular carbon monoxide detector.

It is therefore important that the claims be regarded as including such equivalent construction insofar as they do not depart from the spirit and scope of the vehicular carbon monoxide detector. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
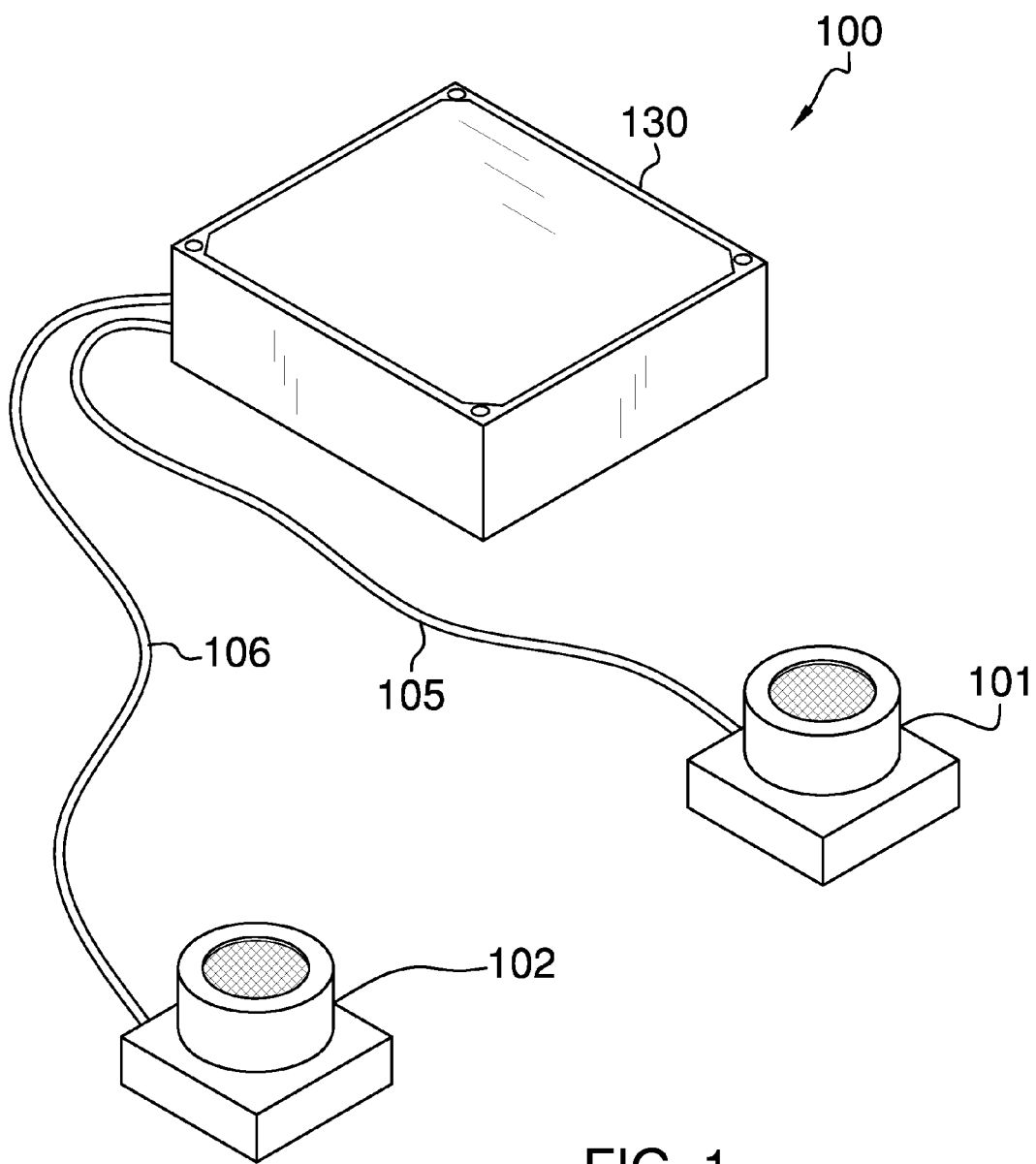
FIG. 1 is a perspective view of the vehicle computer in wired communication with carbon monoxide sensors.
Figure 2:
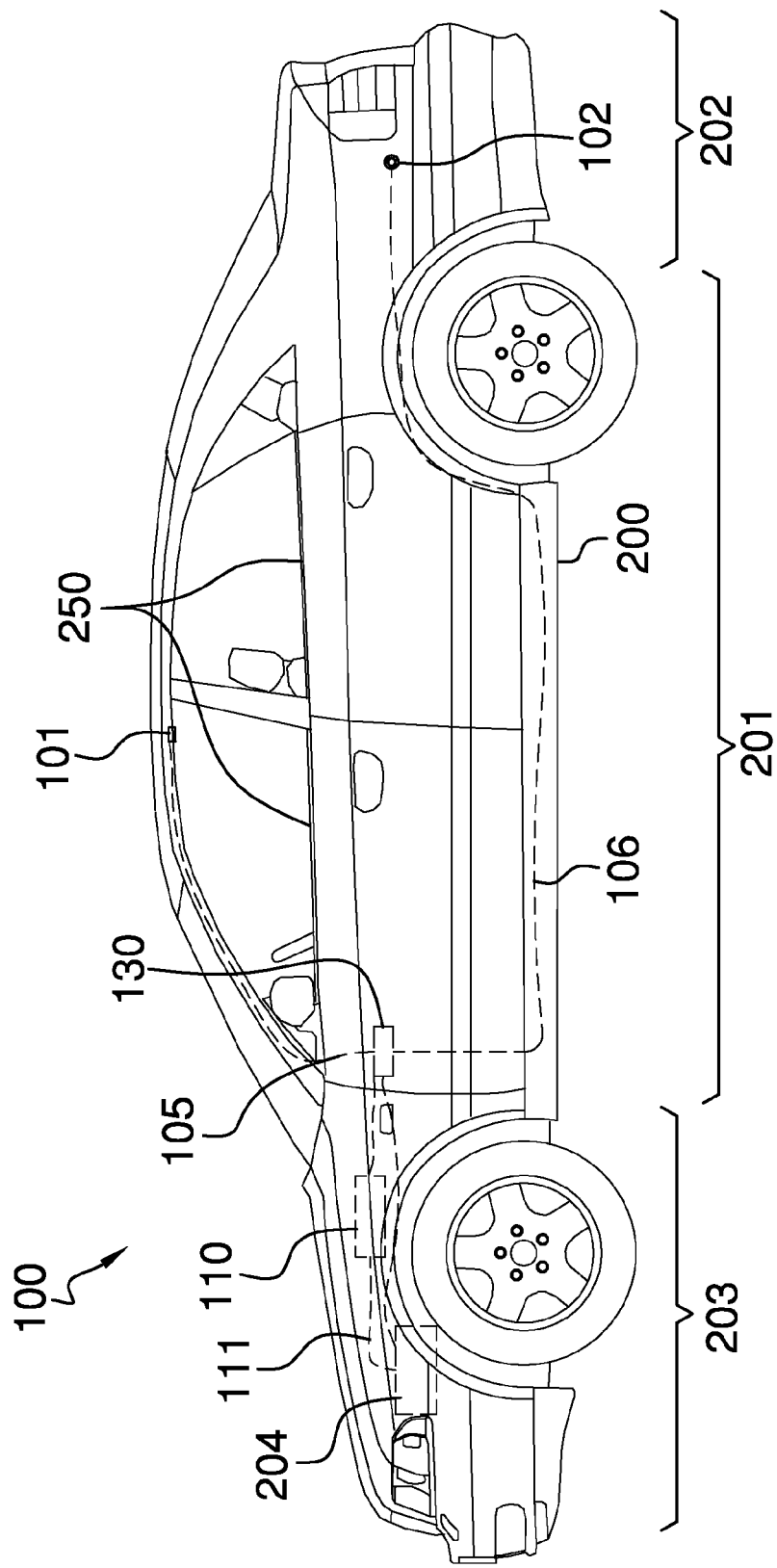
FIG. 2 is a side view of the vehicular carbon monoxide detector installed in a vehicle, and depicting wired communication of carbon monoxide sensors outside the car and cabin of the vehicle to the vehicle computer.
Figure 3:
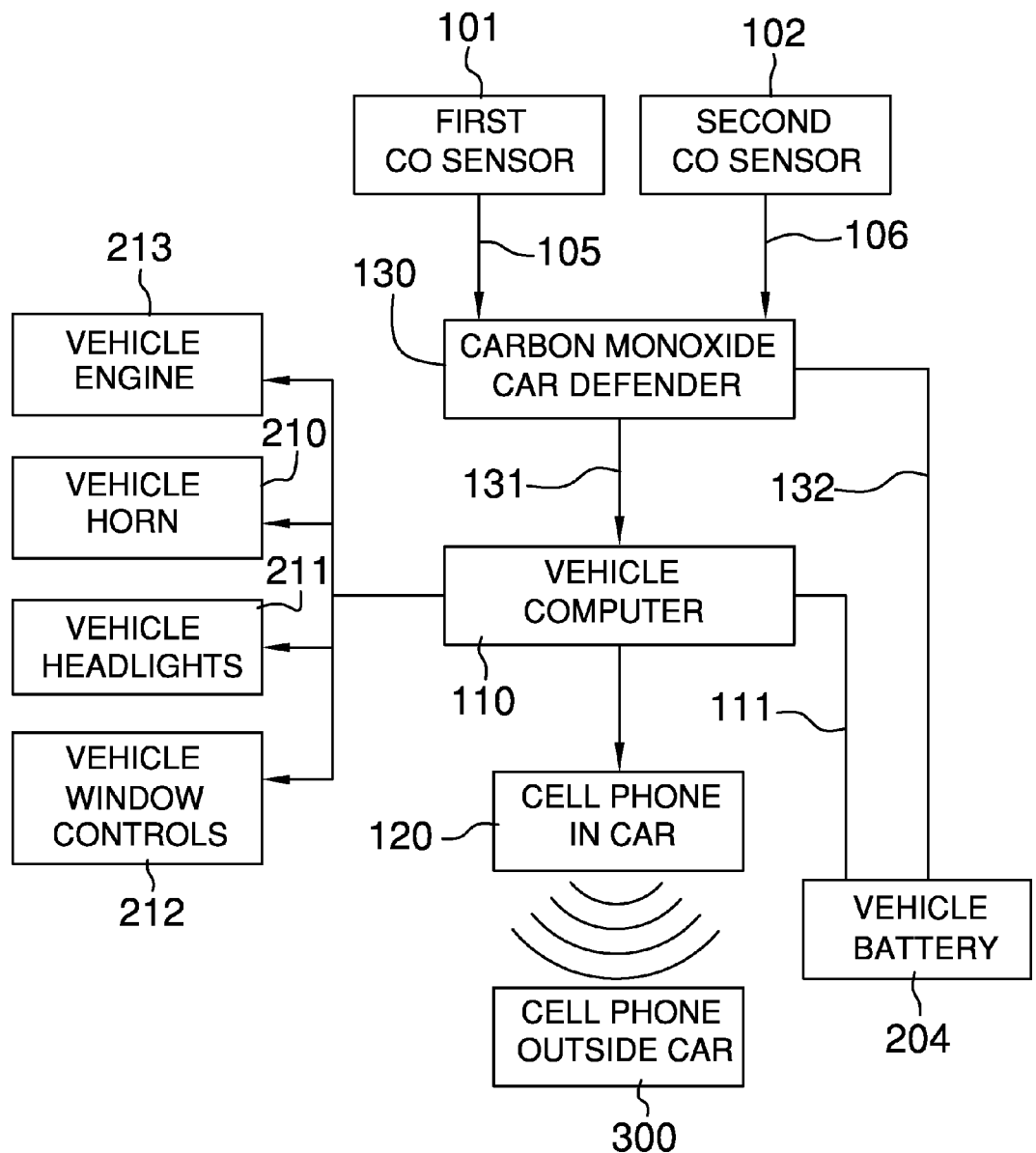
FIG. 3 is a block diagram of the vehicular carbon monoxide detector.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 4, the vehicular carbon monoxide detector 100 is further comprised of a first carbon monoxide sensor 101 and a second carbon monoxide sensor 102. The first carbon monoxide sensor 101 is configured for use within a passenger cabin 201 of a vehicle 200; whereas the second carbon monoxide sensor 102 is configured for use outside of the passenger cabin 201 of the vehicle 200. Moreover, the second carbon monoxide sensor 102 is ideally adapted for use outside of a trunk compartment 202 of the vehicle 200. The first carbon monoxide sensor 101 and the second carbon monoxide sensor 102 are included with the invention 100 in order to detect the presence of a carbon monoxide gas inside of the passenger cabin 201 or outside of the trunk compartment 202.

The first carbon monoxide sensor 101 and the second carbon monoxide sensor 102 are both connected with a carbon monoxide computer 130 via a first wire 105 and a second wire 106. The carbon monoxide computer 130 is in turn wired to a vehicle computer 110 via a third wire 131. The vehicle computer 110 is being used to loosely refer to a computer that is either a pre-existing component of the vehicle 200 or is an add-on computer that is installed onto the vehicle 200 in order to provide additional capabilities to a used vehicle.

The carbon monoxide computer 130 is responsible for all functioning of the invention 100. The vehicle computer 110 may be adaptively located in an engine compartment 203 of the vehicle 200. The vehicle computer 110 is adaptively in wired communication with a vehicle battery 204, which is usually located inside of the engine compartment 203. Moreover, the vehicle computer 110 connects with the vehicle battery 204 via a computer power wire 111. The carbon monoxide computer 130 is in wired communication with the vehicle battery 204 via a fourth wire 132.

The vehicle computer 110 is in wired communication with a vehicle horn 210, vehicle headlights 211, vehicle window controls 212, and the vehicle engine 213. The vehicle computer 110 is able to detect whether the vehicle engine 213 is running or not. Moreover, the vehicle computer 110 is able to operate the vehicle horn 210, the vehicle headlights 211, and the vehicle window controls 212. The vehicle computer 110 is also in wired communication with a cellular transceiver 120. The cellular transceiver 120 is configured to communicate with a cellular telephone 300.

Figure 4:
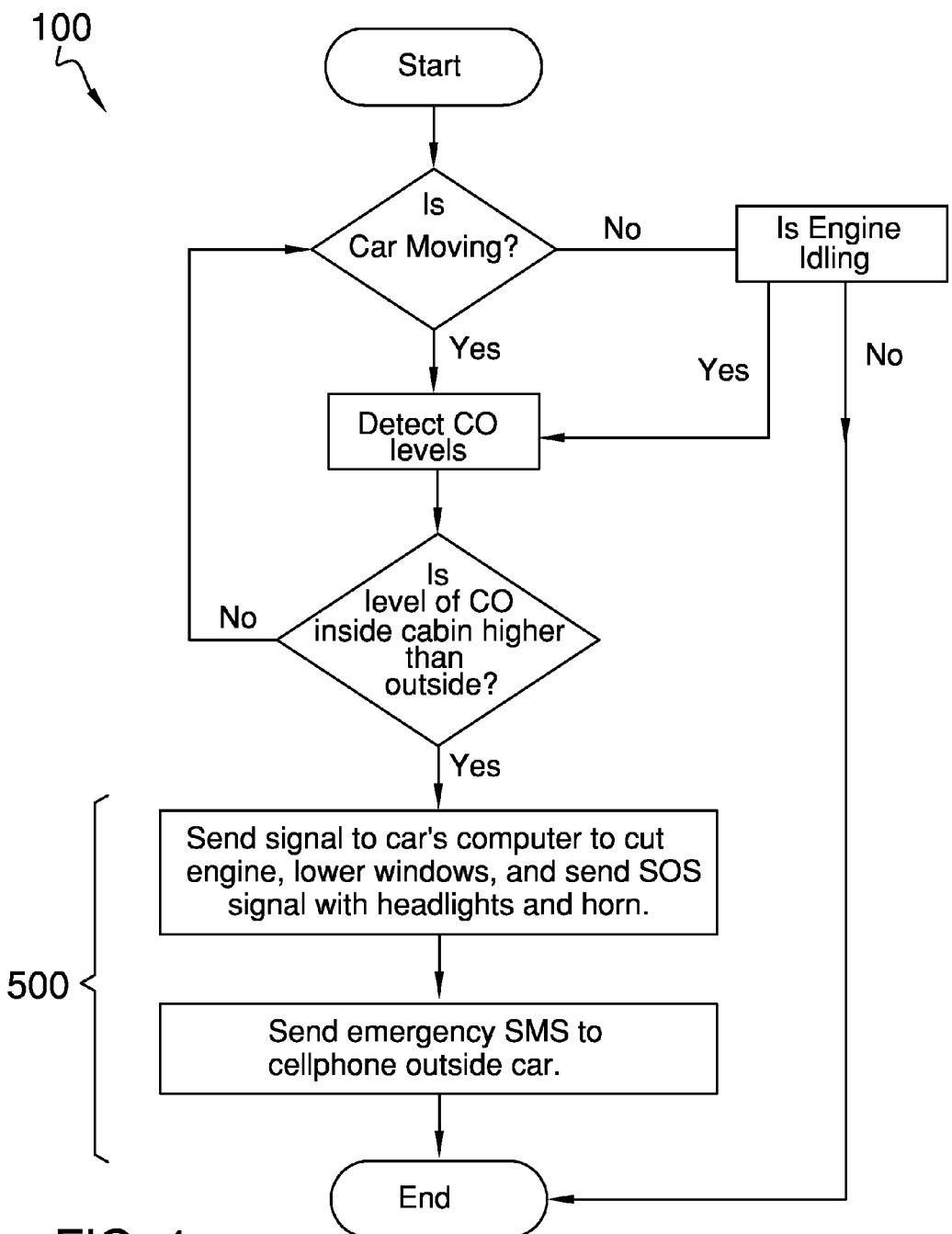
FIG. 4 is a flow diagram of the vehicular carbon monoxide detector.

Referring to FIG. 4, the invention 100 follows a flow diagram in order to decipher whether or not unsafe carbon monoxide levels are present with respect to the vehicle 200, and more importantly, whether to issue an alarm in the form of sounding the vehicle horn 210 or flashing the vehicle headlights 211 or lowering vehicle windows 250 via the vehicle window controls 212 or communicating an alarm to the cellular telephone 300 via the cellular transceiver 120.

The vehicle computer 110 monitors the vehicle engine 213 to decipher whether the vehicle 200 is moving or simply parked and idling. If the car is not moving and the vehicle engine 213 is turned off, then the flow diagram goes to the end. However, if the vehicle 200 is not moving and the vehicle engine 213 is turned on, then the flow diagram shall go to detect carbon monoxide levels via the first carbon monoxide sensor 101 and the second carbon monoxide sensor 102. It shall be noted that if the vehicle 200 is moving, the flow diagram shall go on to detect carbon monoxide levels.

The flow diagram of FIG. 4 utilizes a comparator function in determining carbon monoxide levels via the first carbon monoxide sensor 101 and the second carbon monoxide sensor 102. Moreover, the flow diagram looks to see if the first carbon monoxide sensor 101 has a higher reading when compared to the second carbon monoxide sensor 102. Moreover, if the answer is that the first carbon monoxide sensor 101 has a higher reading than the second carbon monoxide sensor 102, then the invention 100 emits an alarm protocol 500 (see FIG. 4).

The alarm protocol 500 comprises sounding the vehicle horn 210 or flashing the vehicle headlights 211 or lowering vehicle windows 250 via the vehicle window controls 212 or communicating an alarm to the cellular telephone 300 via the cellular transceiver 120.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicular carbon monoxide detector comprising:
at least two carbon monoxide sensors that are configured for use in either a passenger cabin or outside of the passenger cabin of a vehicle in order to detect carbon monoxide levels;
upon detection of unsafe carbon monoxide levels inside of the passenger cabin, an alarm protocol is issued in order to alert recipients of the presence of unsafe levels of carbon monoxide inside of the vehicle;
wherein the carbon monoxide sensors are further defined as a first carbon monoxide sensor and a second carbon monoxide sensor;
wherein the first carbon monoxide sensor is configured for use within the passenger cabin of the vehicle; whereas the second carbon monoxide sensor is configured for use outside of the passenger cabin of the vehicle; wherein the second carbon monoxide sensor is configured for use outside of the vehicle or adjacent to a trunk compartment of the vehicle;
wherein the first carbon monoxide sensor and the second carbon monoxide sensor are both connected with a carbon monoxide computer via a first wire and a second wire, respectively; wherein the carbon monoxide computer is adaptively wired with a vehicle computer via a third wire; wherein the vehicle computer is adaptively located in an engine compartment of the vehicle; wherein the vehicle computer is adaptively in wired communication with a vehicle battery; wherein the vehicle computer connects with the vehicle battery via a computer power wire; wherein the carbon monoxide computer is adaptively wire to the vehicle battery via a fourth wire;
wherein the vehicle computer deciphers if the vehicle is in motion or not; wherein the vehicle computer deciphers whether the engine is turned off or is idling; wherein the event the vehicle is in motion or idling, the vehicle computer deciphers whether the passenger compartment has a carbon monoxide level that is unsafe or is elevated above outside of the passenger cabin; whereupon the event that the carbon monoxide level inside of the passenger cabin is unsafe or is greater than outside of the passenger cabin, the alarm protocol is issued.

2. The vehicular carbon monoxide detector according to claim 1 wherein the vehicle computer is in wired communication with a vehicle horn, vehicle headlights, vehicle window controls, and the vehicle engine; wherein the vehicle computer is able to detect whether the vehicle engine is running or not; wherein the vehicle computer is also able to detect whether the vehicle is moving or not.

3. The vehicular carbon monoxide detector according to claim 2 wherein the vehicle computer selectively operates the vehicle horn, the vehicle headlights, and the vehicle window controls in the event of an alarm protocol.

4. The vehicular carbon monoxide detector according to claim 3 wherein the vehicle computer is also in wired communication with a cellular transceiver; wherein the cellular transceiver is configured to communicate with a cellular telephone in the event of an alarm protocol.

5. The vehicular carbon monoxide detector according to claim 1 wherein the alarm protocol comprises sounding the vehicle horn or flashing the vehicle headlights or lowering vehicle windows via the vehicle window controls or communicating an alarm to the cellular telephone via the cellular transceiver.

6. A vehicular carbon monoxide detector comprising:
at least two carbon monoxide sensors that are configured for use in either a passenger cabin or outside of the passenger cabin of a vehicle in order to detect carbon monoxide levels;
upon detection of unsafe carbon monoxide levels inside of the passenger cabin, an alarm protocol is issued in order to alert recipients of the presence of unsafe levels of carbon monoxide inside of the vehicle;
wherein the carbon monoxide sensors are further defined as a first carbon monoxide sensor and a second carbon monoxide sensor;
wherein the first carbon monoxide sensor is configured for use within the passenger cabin of the vehicle; whereas the second carbon monoxide sensor is configured for use outside of the passenger cabin of the vehicle; wherein the second carbon monoxide sensor is configured for use outside of the vehicle or adjacent to a trunk compartment of the vehicle;
wherein the first carbon monoxide sensor and the second carbon monoxide sensor are both connected with a carbon monoxide computer via a first wire and a second wire, respectively; wherein the carbon monoxide computer is adaptively wired with a vehicle computer via a third wire; wherein the vehicle computer is adaptively located in an engine compartment of the vehicle;
wherein the vehicle computer is adaptively in wired communication with a vehicle battery; wherein the vehicle computer connects with the vehicle battery via a computer power wire; wherein the carbon monoxide computer is adaptively wire to the vehicle battery via a fourth wire;
wherein the vehicle computer deciphers if the vehicle is in motion or not; wherein the vehicle computer deciphers whether the engine is turned off or is idling; wherein the event the vehicle is in motion or idling, the vehicle computer deciphers whether the passenger compartment has a carbon monoxide level that is unsafe or is elevated above outside of the passenger cabin; whereupon the event that the carbon monoxide level inside of the passenger cabin is unsafe or is greater than outside of the passenger cabin, the alarm protocol is issued.

7. The vehicular carbon monoxide detector according to claim 6 wherein the vehicle computer is in wired communication with a vehicle horn, vehicle headlights, vehicle window controls, and the vehicle engine; wherein the vehicle computer is able to detect whether the vehicle engine is running or not; wherein the vehicle computer is also able to detect whether the vehicle is moving or not.

8. The vehicular carbon monoxide detector according to claim 7 wherein the vehicle computer selectively operates the vehicle horn, the vehicle headlights, and the vehicle window controls in the event of an alarm protocol.

9. The vehicular carbon monoxide detector according to claim 8 wherein the vehicle computer is also in wired communication with a cellular transceiver; wherein the cellular transceiver is configured to communicate with a cellular telephone in the event of an alarm protocol.

10. The vehicular carbon monoxide detector according to claim 9 wherein the alarm protocol comprises sounding the vehicle horn or flashing the vehicle headlights or lowering vehicle windows via the vehicle window controls or communicating an alarm to the cellular telephone via the cellular transceiver.

* * * * *